United States Patent
Karlsson et al.

(10) Patent No.: US 6,759,378 B2
(45) Date of Patent: Jul. 6, 2004

(54) AGENT FOR CLEANING

(75) Inventors: Kjell Karlsson, Mölndal (SE); Hans Magnusson, Kållered (SE)

(73) Assignee: Stripp Chemicals AB (CH)

( * ) Notice: Subject to any disclaimer, the term of this patent is extended or adjusted under 35 U.S.C. 154(b) by 0 days.

(21) Appl. No.: 10/220,232

(22) PCT Filed: Mar. 2, 2001

(86) PCT No.: PCT/SE01/00457

§ 371 (c)(1),
(2), (4) Date: Aug. 27, 2002

(87) PCT Pub. No.: WO01/64797

PCT Pub. Date: Sep. 7, 2001

(65) Prior Publication Data

US 2003/0040449 A1 Feb. 27, 2003

(30) Foreign Application Priority Data

Mar. 2, 2000 (SE) ................................................ 0000687

(51) Int. Cl.$^7$ .............................. C11D 3/43; C11D 1/08; C11D 3/26
(52) U.S. Cl. ........................ 510/212; 510/202; 510/206; 510/407; 510/500; 134/38; 134/39; 134/40
(58) Field of Search ................................. 510/202, 206, 510/212, 407, 500, 201, 207, 203, 421, 365; 134/38, 39, 40

(56) References Cited

U.S. PATENT DOCUMENTS

| 4,085,059 A | * 4/1978 | Smith et al. |
| 4,780,235 A | 10/1988 | Jackson |
| 5,310,496 A | 5/1994 | Taylor |

FOREIGN PATENT DOCUMENTS

| DE | 2835769 | | 2/1980 |
| JP | 08227927 | * | 8/1996 |
| JP | 09275039 | * | 9/1997 |
| JP | 1006800 | | 3/1998 |
| JP | 10068000 | * | 3/1998 |

* cited by examiner

Primary Examiner—Gregory Webb
(74) Attorney, Agent, or Firm—Orum & Roth

(57) ABSTRACT

The present invention relates to an agent for the safe and environmentally friendly cleaning of components, for example from paint, lacquer, adhesive and rubber, in the absence of a negative effect on the components and the environment. The agent in accordance with the invention contains N-methyl 2-pyrrolidon with the addition of alkaline salt of unsaturated fatty acids and water.

7 Claims, No Drawings

AGENT FOR CLEANING

The present invention relates to an agent for cleaning objects, such as the removal of paint, lacquer, rubber, adhesive and plastic.

Chlorinated solvents, such as methylene chloride and trichloroethylene, have been in use for some considerable time in industry for this purpose.

It is now a well known fact that these substances are carcinogenic and cause damage to the central nervous system. They also contribute to acidification in nature.

Today's industrial painting process utilizes a great deal of paints of the two-component type, for example epoxy and isocyanate paints and powder coatings. Faults occur in the paint coating from time to time, which require removal of the paint and reapplication, especially in the case of expensive items and for large series. The painting process also often makes use of special fixtures for suspending the work piece. These must also be cleaned of paint at regular intervals. The methods used for paint removal can be subdivided traditionally into thermal, mechanical and chemical paint removal methods.

Thermal denotes burning off at high temperature. This is only possible with components which are able to withstand a high temperature and are not sensitive to deformation. Components made of aluminium, for example, are not suitable for this method. The method also gives rise to fumes, which are undesirable from an environmental point of view.

Mechanical paint removal essentially denotes blasting with different types of blasting agent, e.g. sand or steel balls. This method is also not suitable for components which are sensitive to mechanical deformation or are subject to requirements in respect of surface fineness. The method also creates dust, which is undesirable in a painting plant from the point of view of quality.

Agents based on caustic soda or methylene chloride have been used primarily for chemical paint removal. Caustic soda cannot be used on aluminium because caustic soda has a severely corrosive effect on this metal. It is also not effective on modern two-component paints or powder coatings. Methylene chloride is a very good paint removal agent on most substrates and paint materials, especially when used in conjunction with so-called activators such as formic acid. The use of methylene chloride is prohibited, however, in many countries because of the aforementioned environmental characteristics.

Industrial gluing processes utilize tools and fixtures which require regular cleaning. The adhesives used are often of the epoxy or polyurethane type.

Moulds and tools which require to be cleaned of rubber residues in order to ensure their effective function are used in the rubber industry. Methylene chloride in various formulations is used almost exclusively for this cleaning.

There is thus no acceptable agent available which is suitable for use in an effective and environmentally friendly fashion in the above-mentioned applications.

The principal object of the present invention is thus, in the first instance, to identify replacement agents for chlorinated solvents, primarily methylene chloride, which also exhibit acceptable environmental and technical characteristics.

The aforementioned object is achieved by means of an agent in accordance with the present invention, which is characterized essentially in that it contains N-methyl-2-pyrrolidone, with the addition of alkaline salt of unsaturated fatty acids and water.

The possibility of using N-methyl-2-pyrrolidone, the commonly used acronym for which is NMP, for removing paint and lacquer from components made of wood or metal, for example, is previously disclosed. NMP possesses a low surface tension and penetrates the paint layer, which it then swells up and is released form the substrate and can then be removed easily, for example, by brushing or spraying with water. Pure NMP is only suitable for use with "simpler" paint materials, however, such as alkyd or acrylic paints. The nature of the treatment applied to the base material is also very important. A chromated aluminium surface or a phosphated steel surface thus offers very good adhesion to the pain material, which makes its removal difficult to a high degree. It has emerged in the course of laboratory tests and practical operating tests that the addition of small quantities of potassium oleate or other alkaline salts of unsaturated fatty acids significantly improve the ability of NMP to penetrate layers of paint and bring about the release of the aforementioned layers from chromated or phosphated substrates.

The optimal function is achieved at a high temperature within the range 80–110°, preferably in a thermostatically controlled tank. Adhesive and rubber residues can also be removed with this method. Potassium oleate is the potassium salt of oleic acid. Oleic acid belongs to the group of unsaturated fatty acids, i.e. they contain one or more double bonds. A characteristic exhibited by these substances is that they oxidize easily at high temperatures. Potassium oleate thus oxidizes at a high temperature and forms acidic products, nonanic and azelaic acid, which significantly impair the durability and function of the agent. Countless commercially available, so-called oxidation inhibitors have been tested in an effort to prevent the aforementioned oxidation, but without yielding any results. It has nevertheless been found in laboratory tests and in tests conducted under practical operating conditions that the addition of a small quantity of water, which is usually not desired in NMP formulations, gives the intended positive effect. The content of water should preferably be between 1.0 and 15%, calculated in relation to the quantity of NMP.

The addition of aliphatic alcohols, for example ethyl alcohol, significantly improves the dissolving of the aforementioned alkaline salts. The content of aliphatic alcohol is preferably between 1 and 10%.

EXAMPLES

One way of measuring the acidification in a cleaning agent in accordance with the foregoing is to measure the consumption of 0.1-n sodium hydroxide solution per 5 ml of sample by electrometric titration to pH 9.4. This consumption in ml is referred to as the acid value.

A sample which was aged at 110° C. for 1 000 hours and contained 3% of potassium oleate was found at the end of the test to have an acid value=8.0 and a non-existent function.

Another sample which was aged as described above, and which, in addition to 3% potassium oleate, also contained 6% water, was found at the end of the test to have an acid value=2.5 and a perfectly adequate function. The appropriate content of potassium oleate is preferably between 0.2 and 6%, calculated in relation to the quantity of N-methyl-2-pyrrolidone.

It has emerged in the course of practical tests that the addition of a small quantity of water to a solution of NMP and potassium oleate significantly shortens the process time for the removal of paint, adhesive and rubber from components made of metal or plastic.

A single agent in accordance with the present invention solves the aforementioned problems in a simple and effective, as well as an environmentally friendly, fashion.

The invention is naturally not restricted to the above description. Modifications are possible, especially with regard to the nature of the agent or through the use of equivalent technology, without departing from the area of protection for the invention as defined in the Patent claims.

What is claimed is:

1. Agent for cleaning objects, such as the removal of paint, lacquer, rubber, adhesive and plastic wherein the agent contains N-methyl-2-pyrrolidone with the addition of alkaline salt of unsaturated fatty acids and water said alkaline salt is in the form of potassium oleate, the content of alkaline salt is between 0.2 and 6%, calculated in relation to the quantity of N-methyl-2-pyrrolidone, and the content of water is between 0.1% and 15%, calculated in relation to the quantity of N-methyl-2-pyrrolidone.

2. Agent for cleaning objects, such as the removal of paint, lacquer, rubber, adhesive and plastic wherein the agent contains N-methyl-2-pyrrolidone with the addition of alkaline salt of unsaturated fatty acids and water said alkaline salt is in the form of potassium oleate, and the agent also contains aliphatic alcohol.

3. Agent for cleaning objects, such as the removal of paint, lacquer, rubber, adhesive and plastic wherein the agent contains N-methyl-2-pyrrolidone with the addition of alkaline salt of unsaturated fatty acids and water, the content of alkaline salt is between 0.2 and 6%, calculated in relation to the quantity of N-methyl-2-pyrrolidone, and the content of water is between 1.0 and 15%, calculated in relation to the quantity of N-methyl-2-pyrrolidone, and the agent also contains aliphatic alcohol.

4. Agent in accordance with Patent claim 2 wherein the content of aliphatic alcohol is between 1 and 10%.

5. Agent in accordance with Patent claim 3 wherein the content of aliphatic alcohol is between 1 and 10%.

6. Agent for cleaning objects, such as the removal of paint, lacquer, rubber, adhesive and plastic wherein the agent contains N-methyl-2-pyrrolidone with the addition of alkaline salt of unsaturated fatty acids and water said alkaline salt is in the form of potassium oleate, the content of alkaline salt is at least 0.2%, calculated in relation to the quantity of N-methyl-2-pyrrolidone, and the content of water is between 0.1% and 15%, calculated in relation to the quantity of N-methyl-2-pyrrolidone.

7. Agent in accordance with Patent claim 6 wherein the content of alkaline salt is between 0.2 and 6%, calculated in relation to the quantity of N-methyl-2-pyrrolidone.

* * * * *